Figure 1:
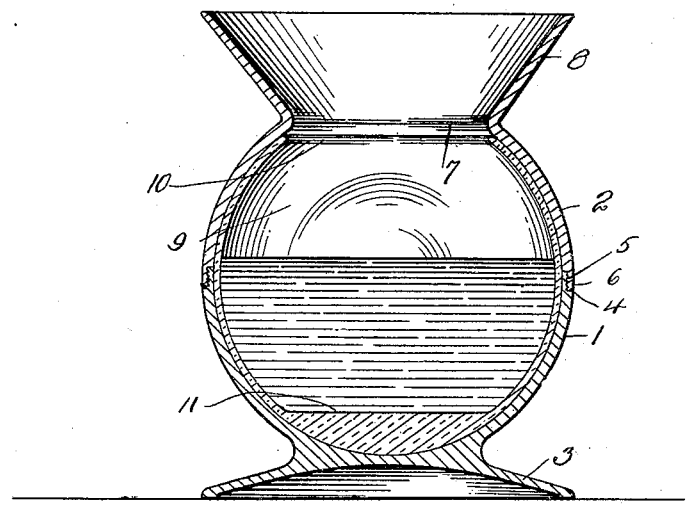

G. R. TESCHEL.
CUSPIDOR.
APPLICATION FILED APR. 22, 1909.

938,912.

Patented Nov. 2, 1909.

Witnesses
Samuel Payne
R. H. Butler

Inventor
G. R. Teschel
By H C Everett
Attorneys

UNITED STATES PATENT OFFICE.

GEORG RUDOLF TESCHEL, OF PARKERSBURG, WEST VIRGINIA.

CUSPIDOR.

938,912.

Specification of Letters Patent.

Patented Nov. 2, 1909.

Application filed April 22, 1909. Serial No. 491,436.

*To all whom it may concern:*

Be it known that I, GEORG RUDOLF TESCHEL, a subject of the Emperor of Austria-Hungary, residing at Parkersburg, in the county of Wood and State of West Virginia, have invented certain new and useful Improvements in Cuspidors, of which the following is a specification, reference being had therein to the accompanying drawing.

This invention relates to cuspidors, and the object of the invention is to provide a cuspidor from which the contents will not be spilled when the cuspidor is accidentally tilted or upset.

The invention aims to provide a simple and durable cuspidor consisting of three parts easily and quickly assembled, said parts being of a construction readily cleaned and maintained in a sanitary condition. To this end, a cuspidor has been designed along the lines of an ordinary cuspidor having a substantial base, body or receptacle and a funnel-shaped mouth, the cuspidor being preferably made of non-corrosive metal and a vitreous material, whereby the metal and material will not be affected by matter placed in the cuspidor.

The invention will be hereinafter considered in detail and then specifically pointed out in the appended claim, and referring to the drawing forming a part of this application, there is illustrated a preferred embodiment of the invention, and it is to be understood that the structural elements thereof can be varied or changed without departing from the spirit of the invention.

Figure 2:
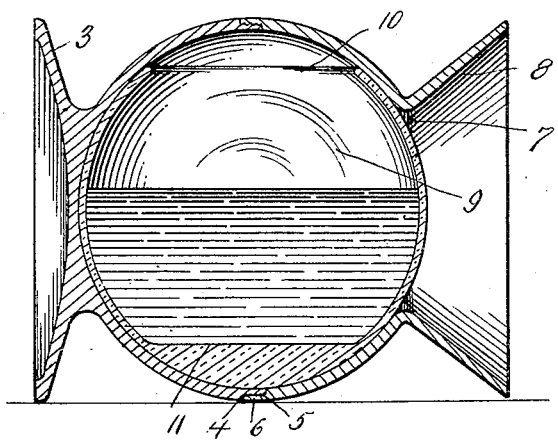
Figure 3:
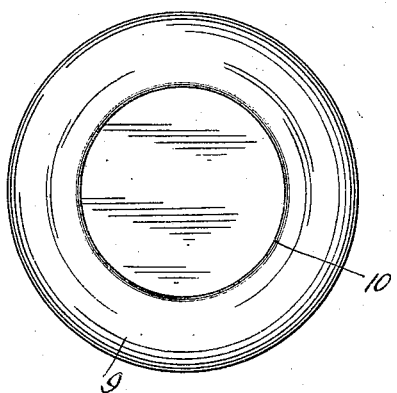

In the drawings:—Figure 1 is a vertical sectional view of the cuspidor in an upright position, Fig. 2 is a similar view of the same tilted or upset, and Fig. 3 is a plan of the inner or movable receptacle of the cuspidor.

In the accompanying drawings, 1 and 2 designate two semi-spherical members composing the body of the receptacle, the member 1 having the bottom thereof provided with an integral base 3 of a diameter approximately the diameter of the member 1, whereby said member can be firmly supported upon a base. The upper edges of the member 1 are cut away, as at 4, and exteriorly screw threaded, as at 5, to receive the depending interiorly screw threaded flange 6 of the member 2. This member 2 is provided with an opening 7 surrounded by a flaring or funnel-shaped flange 8, providing the body of the cuspidor with a mouth of sufficient width to allow matter to easily enter the same.

Prior to connecting the members 1 and 2 together, a spherical receptacle 9 is movably mounted in the member 1, said receptacle being made of glass or a similar vitreous material. This receptacle is provided with an opening or mouth 10 of a diameter slightly greater than the opening 7 and to maintain the opening 10 normally in registration with the opening 7, the receptacle 9 is provided with a thickened or weighted side or bottom 11.

When the cuspidor is tilted or accidentally upset, the receptacle 9 assumes the position shown in Fig. 2 of the drawings, said receptacle sliding around within the members 1 and 2 and preventing the contents of the receptacle from passing through the mouth of opening 7.

The members 1 and 2 are preferably made of brass or a non-corrosive material, and the manner in which these members are connected together permits of easy access being had to the receptacle 7 to clean the same.

Having now described my invention what I claim as new, is:—

A cuspidor comprising a receptacle formed of two hollow semi-spherical sections detachably-connected together, a base connected with the lower of said sections, said upper section at its top open to provide a mouth, a flaring flange connected with the periphery of the upper section and forming a continuation of the mouth, and a spherical vessel mounted in said receptacle and having an opening at its top adapted to register with said mouth, said spherical vessel provided at a point opposite said opening with a segment-shaped enlargement constituting a weight for automatically maintaining said vessel in an upright position when the receptacle is tilted or upset, said vessel having its periphery throughout engaging the inner face of said receptacle, the inner face of said receptacle constituting a bearing surface to the periphery of said vessel.

In testimony whereof I affix my signature in the presence of two witnesses.

GEORG RUDOLF TESCHEL.

Witnesses:
NINA ANDERSON,
GUS SALINGER.